United States Patent
Petion et al.

(10) Patent No.: US 8,630,273 B2
(45) Date of Patent: Jan. 14, 2014

(54) DYNAMIC APPROPRIATION OF AT LEAST ONE MULTIMEDIA DEVICE DURING CALL SET-UP

(75) Inventors: Romaric Petion, Trebeurden (FR); Jean-Christian Villey, Pleumeur Bodou (FR); Xavier Marjou, Lannion (FR); Sarah Tronet, Lannion (FR)

(73) Assignee: France Telecom, Paris (FR)

( * ) Notice: Subject to any disclaimer, the term of this patent is extended or adjusted under 35 U.S.C. 154(b) by 420 days.

(21) Appl. No.: 12/668,933

(22) PCT Filed: Jul. 17, 2008

(86) PCT No.: PCT/FR2008/051351
§ 371 (c)(1),
(2), (4) Date: Feb. 23, 2010

(87) PCT Pub. No.: WO2009/013438
PCT Pub. Date: Jan. 29, 2009

(65) Prior Publication Data
US 2010/0165966 A1 Jul. 1, 2010

(30) Foreign Application Priority Data
Jul. 17, 2007 (FR) ...................................... 07 56542

(51) Int. Cl.
*H04W 4/00* (2009.01)

(52) U.S. Cl.
USPC ......................................................... 370/338

(58) Field of Classification Search
USPC ......................................................... 370/338
See application file for complete search history.

(56) References Cited

U.S. PATENT DOCUMENTS

| 7,400,886 B2 * | 7/2008 | Sahim et al. .................. 455/444 |
| 2005/0271011 A1 | 12/2005 | Alemany et al. |
| 2007/0058637 A1 * | 3/2007 | Lo ............................... 370/395.2 |

FOREIGN PATENT DOCUMENTS

EP 1 545 139 A1 6/2005

* cited by examiner

*Primary Examiner* — Kenny Lin
(74) *Attorney, Agent, or Firm* — Drinker Biddle & Reath LLP

(57) ABSTRACT

The invention relates to a method of dynamic appropriation of at least one second multimedia device by a first device situated in a geographical area in which said at least one second multimedia device is situated in the event of a request to set up a call between the first device and a third device, the method including a step of setting up a first signaling link between a server and the first device and a step of controlling the second and third devices from said server with a view to setting up between the second and third devices at least one first payload data stream forming a first part of said call.

14 Claims, 14 Drawing Sheets

DYNAMIC APPROPRIATION OF AT LEAST ONE MULTIMEDIA DEVICE DURING CALL SET-UP

CROSS REFERENCE TO RELATED APPLICATIONS

This application is the U.S. national phase of the International Patent Application No. PCT/FR2008/051351 filed Jul. 17, 2008, which claims the benefit of French Application No. 07 56542 filed Jul. 17, 2007, the entire content of which is incorporated herein by reference.

BACKGROUND OF THE INVENTION

The invention relates to the use of multimedia devices available to users.

The communication capabilities and ergonomic characteristics of multimedia devices vary greatly from one device to another. Those of a mobile telephone terminal are often limited in terms of screen size, listening comfort, communication bandwidth, etc. There is therefore a need to improve call comfort and/or quality for a user employing such a terminal.

SUMMARY

The invention relates to a method of dynamic appropriation of at least one second multimedia device by a first device situated in a geographical area in which said at least one second multimedia device is situated in the event of a request to set up a call between the first device and a third device, the method including:
  a step of setting up a first signaling link between a server and the first device;
  a step of controlling the second and third devices from said server with a view to setting up between the second and third devices at least one first payload data stream forming a first part of said call.

Thus depending on their geographical location, the user of the first device benefits from the presence of an appropriable device (a device that can be appropriated) in the area in which the first device is located through having access to better devices for executing their applications. This dynamic appropriation of communications devices (videophone, PC, TV, etc.) enhances the comfort of users when in their home environments.

This is made possible by decoupling the setting up of the signaling link with the first device and the setting up of payload data communications streams. The payload data communications streams can therefore be adapted to the respective capabilities of the devices between which they are set up regardless of the real capabilities of the first device used to request call set-up.

In one implementation of the invention, the method includes a step of controlling the first and third devices from said server with a view to setting up between the first and third devices at least one second payload data stream forming a second part of said call.

The shared and simultaneous use of two devices (the first device and the second multimedia device) by the same user during the same call optimizes call quality and comfort for that user.

In the method of one implementation of the invention, the first signaling link is maintained during said call.

Thus it is at all times possible to use the first device to monitor the call, via the signaling links set up with the server, in particular to transfer the call back to the first device.

Via the server, the first device to some extent serves as a remote control device for the streams set up with the second multimedia device.

Moreover, if the first device leaves or enters the geographical area, streams forming part of the call can be transferred to the first device or the second multimedia device respectively without delay if this signaling link is maintained.

In a method of one implementation of the invention, a device identifier is presented to the third device during setting up the first payload data stream, this identifier being that of the first device.

The use of a second multimedia device that can be appropriated at the time of call set-up is therefore transparent for the user of the third device.

In a method of a first alternative implementation of the invention, said at least one first stream is set up initially between the first device and the third device and then transferred between the second multimedia device and the third device after the first device enters said geographical area.

In a method of a second alternative implementation of the invention said at least one first stream is initially set up between the second multimedia device and the third device and then transferred between the first device and the third device after the first device leaves said geographical area.

In both these alternative implementations, transfer of the call to the first or second multimedia device is controlled dynamically as a function of the geographical location of the first terminal. Whatever the location and whatever the change of location, the user of the first device has the use of most appropriate device, the server being able in particular to select, for each of the payload streams to be set up, the device offering the highest performance in terms of communication capabilities and/or ergonomics.

The invention also relates to an application server for dynamic appropriation of at least one second multimedia device by a first device situated in a geographical area in which said at least one second multimedia device is situated in the event of a request to set up a call between the first device and a third device, the server including:
  means for setting up a first signaling link between a server and the first device;
  means for controlling the second and third devices with a view to setting up between the second and third devices at least one first payload data stream forming a first part of said call.

The advantages stated for the method of the invention can be transposed directly to the server of the invention.

In one embodiment, the server of the invention includes means for controlling the first and third devices with a view to setting up between the first and third devices at least one second payload data stream forming a second part of said call.

The features and advantages of the invention become more clearly apparent from the description given by way of example and the figures to which it refers.

The invention is applicable to setting up a service for personalizing ambience to the taste of the user by appropriating devices, in particular devices available to the public. Outside users' home environments, their main communication tool is their mobile telephone, for example. The idea of the invention is to enable a mobile telephone user to obtain automatically the benefits of the multimedia capabilities (high quality video and audio) and communications means of terminals present in their home environment. In the example described to illustrate the invention, the invention is based on an Internet Multimedia Service (IMS) architecture. The idea of this service is to enable users to employ intuitively means such as communications means (videophone, 3D projection terminal, etc.) as a function of their location. In particular, the appropriation service offers users improved comfort via their high bit rate access at home, as a function of the proximity of the users to their home communications devices (videophone, PC, TV, etc.).

This service can be applied in a plurality of environments, one of which is a professional public environment (for example a hotel customer appropriating a room terminal), and another is a consumer environment (for example a mobile user redirecting their mobile calls to an access point offering higher performance).

The invention employs a principle of appropriating communications devices situated in a particular room or space, i.e. taking control of that device, in particular the communications means of the device. Mobile terminal users on the move can thus, on entering a room, appropriate one or more devices and enjoy the advantage of communications means better than those of their own mobile terminals.

Thus the first device is a user terminal, for example, and the second device is a fixed or mobile home, public, company, etc. multimedia device and the at least one second multimedia device consists of one or more available devices, i.e. devices that a first device can appropriate.

To determine what devices a user terminal can appropriate, the invention proposes determining the location of the terminal, in particular using the local radiocommunications network, for example to determine a WiFi location.

In the situation where one or at most two WiFi access points are available in a given geographical area, the WiFi location is reduced to its simplest expression: it is impossible to locate a terminal by triangulation. WiFi location then consists in simply detecting that the user's mobile terminal is in the proximity of a WiFi access point in the user's home. The proximity of the WiFi access point is deduced from the signals received from the terminal exceeding a power threshold. No dedicated network infrastructure is necessary.

For example, to effect the location process, the user terminal determines (in dBm relative to one milliwatt) the transmission power of a WiFi access point that is not necessarily connected to the home network. An area entry threshold value is defined as the value of the transmission power of the WiFi access point above which it can be considered that the user is in the room.

In a variant of the invention, to alleviate problems of random variations, the user's terminal averages a few values in order to attenuate such variations and thus to avoid the user being seen as outside the room for a few seconds when still in the room. An exit threshold is set as a transmission power lower threshold value below which the user is considered to have left the room.

In a variant of the invention, a clock determines a rate at which the location data is obtained and stored (in particular the name, MAC address and transmission powers of all the WiFi access points that the user terminal can pick up, especially in the situation of location by the user terminal). A list of access points is produced in this way that is useful for configuring the application (see below), enabling another WiFi access point to be used to carry out the location process in a highly responsive manner.

A table for each access point stores the various values recovered. It is initialized with an initial value, for example −94 dBm. Each time the access points are listed, the transmission power is stored in a box of the table. On moving, the user stores new access points in their user terminal, which does not need access points that it is no longer picking up (utility and memory occupancy). Thus in a variant of the invention, to effect this sorting, a variable (initialized to 1) linked to each WiFi access point is used to verify whether its table has been updated recently. Each time a value is added to the table or a value in the table is modified, the updated value is set to 1 and goes to 0 after the table has been averaged. If the update value is 0, this indicates that the value of the table has not been modified since the last averaging, i.e. that a mobile terminal is not picking up the access point. A 0 is then placed at the location in the table of powers that should have been filled. If all the values of the table are at 0, this access point is eliminated from the list.

The values from the table of the WiFi access point that are relevant to the terminal are then averaged and compared to the entry and exit power. If it is greater than the entry threshold value, an appropriation application server must be notified that the user has entered the room. If it is below the exit threshold value, the appropriation application server must be notified that the user has left the room. It is at this moment that the update variable must be set to 0 for all the access points from the list.

BRIEF DESCRIPTION OF THE DRAWINGS

The invention can be better understood in the light of the following description, which is given by way of embodiments using non-limiting examples and with reference to the appended drawings, in which.

DETAILED DESCRIPTION OF THE PREFERRED EMBODIMENTS

Figure 1:
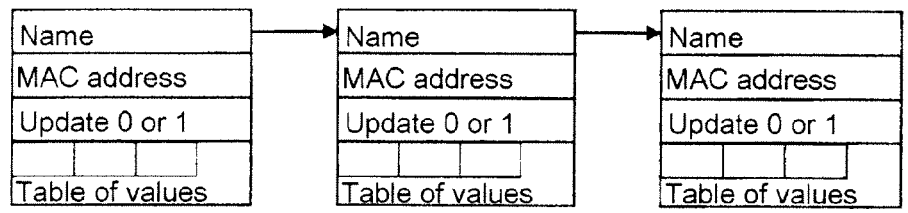
FIG. 1 is a block diagram showing a beneficial data structure for listing WiFi access point.

FIG. 1 shows a beneficial data structure for listing WiFi access points.

The steps of the location process are as follows:

1. list and store/modify WiFi access points in data structure;
2. eliminate access points whose values in table have not been updated (value equal to 0);
3. average table of access point chosen for location process;
4. resume at step 1.

Figure 2:
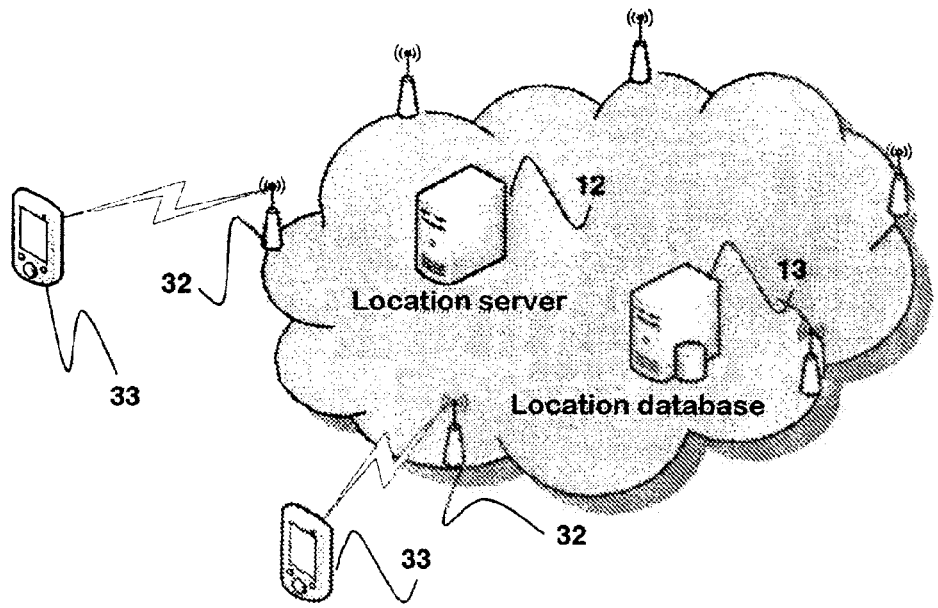
FIG. 2 is a pictorial illustration of a network in which mobile terminals operate.

In another example (see FIG. 2) of location of the user's mobile terminal 33, a location server 12 is used to locate the mobile terminal 33 in an area in order to prompt it to appropriate devices available in that area. The medium for the location process is then a type 802.11 wireless network. The 802.11 standard provides for ranges from 300 meters up to 500 meters outdoors and 50 meters up to 150 meters indoors. However, the 802.11 standard was not conceived at the outset to provide a location medium, in contrast to the GPS standard. However, GPS does not work inside a building. The idea is to use 802.11 wireless networks that are already present to perform the location process. The advantage of this method is that it does not lead to any infrastructure overhead if a wireless network already exists. If that network is not sufficiently dense and does not cover a sufficiently large area, evolution toward a larger network is simple and of relatively low cost.

The location algorithm used locates a terminal on the basis of the list of reception levels of each access point. The general principle is as follows:

The user's terminal sends the location server a list containing the accessible WiFi access points and their respective reception levels.

The location server receives this list and uses its algorithm to determine in which area the user is located.

The location server then updates the location database.

The location resolution is of the order of one room. If a customer is moving inside the building, the system tracks their movements and detects changes of area correctly. There are significant differences in reception levels between rainy weather and dry weather and the location server can compensate for these if a relative humidity sense is provided.

The invention utilizes an architecture serving as an intermediate logic layer between, firstly, the terminals and the IP-oriented transport networks and, secondly, the device appropriation application services. In the FIG. 3 example, this architecture is an IMS architecture serving as a logic layer with telecom application services (voice over IP, push-to-talk, instant messaging) in addition to device appropriation application services. This architecture uses certain technical functions (control and signaling mechanisms) between different devices at the core of an operator network, using in particular the Session Initiation Protocol (SIP) signaling protocol standardized by the Internet Engineering Task Force (IETF). Independently of the nature of the data transported, the SIP signaling protocol also detects the presence of the user, a fact of which Internet instant messaging users are well aware.

Furthermore, this protocol provides for decoupling between, firstly, setting up payload data streams (voice, audio, video, multimedia data, etc. that are the purpose of the call and/or are exchanged between the users) exchanged between the devices during a call set up between the devices and, secondly, setting up signaling streams. In particular it maintains a signaling stream independently of the presence of a corresponding payload data stream.

Moreover, this protocol provides mechanisms for declaring the capabilities of the terminals and dynamically determining the payload data coding and transmission parameters to be used when setting up the streams conveying this data.

The appropriation service is based on this architecture, which comprises the following elements:

a call session control function 15 (Serving Call Session Control Function (S-CSCF) for IMS) is a logic function in the new generation network that can be physically provided by different nodes of a network such as an IMS network; this core function combines a routing engine with a rules manager that acts as an intermediate logic layer between, firstly, the access and transport networks and, secondly, the services and applications;

a server 18 managing the directory of subscribers, their profiles and their authentication when they access the network (the Home Subscriber Server (HSS) for IMS); this server also manages the correspondence between a person's name and the IP addresses needed to contact them;

an application server (Pagure AS) 34 including at least one appropriation application server 34 using the SIP; and in some embodiments, a welcome clip server 17 for broadcasting an audio/video content in the network.

A device can be appropriated if it has been identified as one that can be appropriated because it is made available to users. Furthermore, it is referenced as being situated in a particular geographical area. Finally, it is adapted to be controlled by the application server 34, in particular using the SIP.

Under such circumstances, the appropriation application server 34 has a list of geographical areas and the associated SIP device, i.e. those registered as being able to be appropriated (appropriable) and situated in the corresponding geographical area.

The devices can be of various kinds: audio terminal, microphone, loudspeakers, video terminal, video camera, screen, 3D video terminal (capable of managing two media streams), lighting system, fragrance diffuser system, etc.

The mobile terminal 33 of the user is equipped with means enabling it to be located, for example means for radiocommunication with a local area network, in particular with a WiFi network to enable WiFi location, such as a WiFi telephone, a WiFi PDA, etc. able to communicate with the application server 34.

Figure 3:
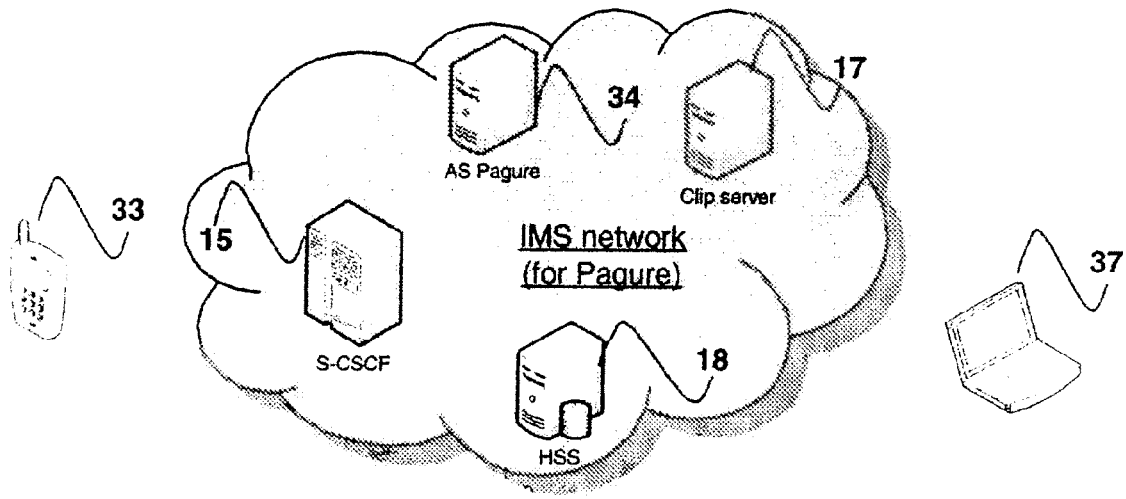
FIG. 3 is a pictorial illustration of an exemplary IMS architecture.

Access to the appropriation service can presuppose a subscription to the service. The user then has an account valid for the network associated with the appropriation application server 34. The data of the profile associated with this account is stored in the HSS database 18 (FIG. 3). This profile includes information specific to the IMS network (surname, forename, address, billing, etc.) as well as information concerning the services to which the user has subscribed. In a variant of the appropriation service, the user can set parameters of a preferred clip, indicating their downloading address. They must also give the address (the MAC address for a WiFi access point) of their mobile terminal that they use in the context of this service.

Figure 4:
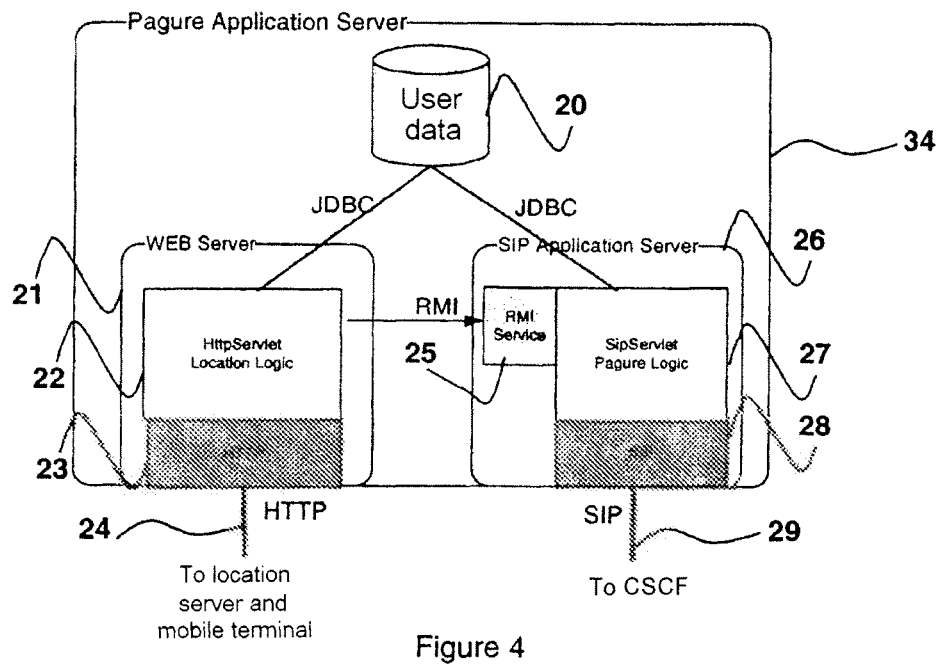
FIG. 4 is a block diagram illustrating the Pagure Application Server.

The appropriation application server 34 stores a list of areas associated with terminals that can be controlled, in particular using the SIP. The appropriation application server 34 is registered with the location server to obtain presence information as shown in FIG. 4. In other words, on each change of presence information (new users (identified by their MAC address) in an area, change of area, etc.), the location server warns the appropriation application server 34 of that change. The appropriation application server 34 must then seek the user associated with the MAC address for which it has received a presence event and apply the processing as a function of the preceding states and in accordance with the usage rules.

As shown in FIG. 4, the appropriation application server 34 is made up of three parts in particular:

an interface 22 (http Servlet) with the location means (of the location server, a web server or the user terminal), which interface is used in a server 21 such as a web server;

a management server 26 (SIP application server) of applications such as a SIP application server for SIP calls and usage logic; and a database 20 for storing user data.

The http Servlet interface server 22 is able to:

receive location information messages from the location server or the location module of the user terminal;

verify whether requesting confirmation of transfer to the user is indicated (by referring to the configuration of the service in the user profile database);

if necessary, send a confirmation request message to the user terminal;

receive a confirmation response; and invoke the corresponding function or remote usage rule on the application server 34 (link with service RMI 25 in FIG. 4).

The functions available include:
the user enters an area;
the user leaves an area;
the user enters their home; and
the user leaves their home.

A portion 27 of the application server 34 (Pagure Logic Sip Servlet) is responsible for all call transfers (welcome clip, call transfer from/to an appropriate terminal, etc.).

Figure 5:
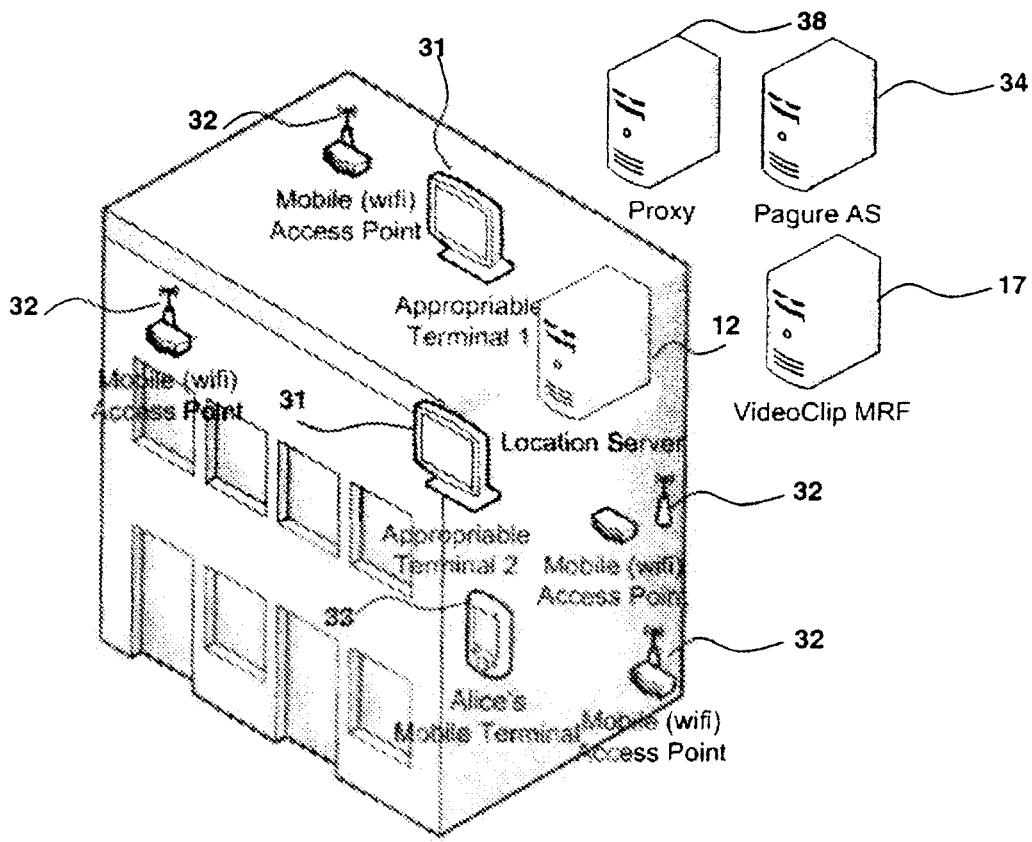
FIG. 5 is a pictorial diagram illustrating multiple WiFi access points.

If location is effected by triangulation—if WiFi coverage is provided by a plurality of access points 32, in particular in a business context—a location server 12 like that from FIG. 5 is used to determine the precise location of the user. A request for confirmation by the user can be provided to confirm the change of terminal. If a user can appropriate a device 31, a confirmation message is shown on their terminal in order for them to validate that appropriation.

Example of format of response to verification if confirmation must be requested:
200 OK
HTTP headers . . . .
Confirm=yes Example of confirmation response format:
POST http/terminal/PAddress:8080/Pagure/Locinfo Servlet?confirmed=yes&macaddr=<macaddress>

If location cannot be effected by triangulation—generally if using a single WiFi access point, in particular in a home application context—the location server described above is replaced, as shown in FIG. 6, by the mobile terminal 33 of the customer, which has to determine their proximity or non-proximity to the WiFi access point 32 and thus the device 31 that can be appropriated. In this situation, only one device 31 can be appropriated and the user can appropriate it when they find themselves in the vicinity of this device 31 (after user validation). Locating the user's mobile terminal 33 relative to the WiFi access point 32 using a plurality of threshold values could be envisaged: in each range between two threshold values, a given device associated with that range is referenced as able to be appropriated.

Figure 6:
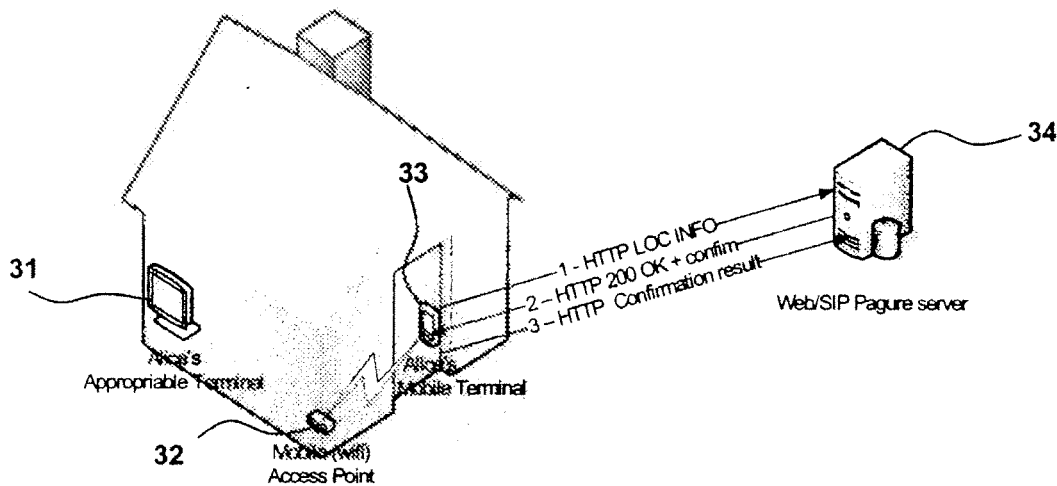
FIG. 6 is a pictorial diagram illustrating a home application context using a single WiFi access point.

In the example shown by FIG. 6, which shows the overall communication process between the user 33 and the appropriation application server 34, the user terminal and the appropriation application server 34 communicate by WiFi and the mobile terminal must therefore be connected to the home network: configuration is effected by the operating system of the mobile terminal.

In a variant of the invention, launching the appropriation application triggers sending the appropriation server a message notifying it that the terminal has "exited": this means that the user has no appropriated device has not been declared as being located in an area containing a device, in particular a device that can be appropriated, whether the user's terminal is in fact in an area including such devices or not.

In a variant of the invention, wherever the terminal is located relative to a device, disconnecting the user terminal from the appropriation application triggers sending an exit message to the appropriation application server 34. This enables a current clip to be stopped and blocks future call transfers that must now not take place.

This exit message is in particular of the form:
http://PAGUREaddress/pagure/LocinfoServlet?sphere=home&macaddr=00:01:02:03:04:05&action=out
where
"PAGUREaddress" is the address of the appropriation application server 34;
"sphere=home" indicates that the user has the home version of the appropriation application on their terminal (i.e. that location is effected by the user's terminal);
"macaddr=00:01:02:03:04:05" gives the MAC address of the mobile terminal used (because it is possible to have a plurality of mobile terminals communicating with the appropriation application server 34); and
"action=out" indicates to the appropriation application server 34 that the user has just left the room.

A user in possession of their WiFi access point, in particular with their mobile telephone in their pocket, enters an area (or room), for example in their home, which contains a terminal that can be appropriated (such as a television). Because the mobile terminal has been detected in the vicinity of this terminal that can be appropriated, the location server sends an alert to the appropriation application server 34: the appropriation application server 34 then attaches the television to the mobile telephone. In a variant of the invention, after confirmation by the user, the appropriation application server 34 connects the terminal in this area to the clip server in order to welcome the user with their preferred clip, as defined in their profile, by broadcasting it to their television. This welcome stage informs the user that they are in a position to use this communications device for their requirements.

After this, the user in possession of their WiFi access point finding themselves in an area in which there is a terminal that can be appropriated, if someone attempts to contact the user on their mobile telephone, their mobile telephone rings and when they pick up the call is routed to the terminal that can be appropriated situated in the area in which the user is located, rather than to their mobile terminal. The appropriation service thus enriches the call by setting up an additional video stream using the television. The user is then able to benefit from the display of the image of the other party on their television (if the other party has a video terminal) and the other party can see the user on their video terminal.

In the variant of the invention that includes a welcome stage, if this call occurs during a welcome stage (playback of their preferred clip), the appropriation application server 34 stops the server clip in question.

If the user is communicating with someone using a terminal that can be appropriated situated in the area and wishes to leave that area (for example if the user decides to move away from their television), the location means (the appropriate client application of the user terminal when location is performed by the terminal or the location server) detect the user's terminal leaving the area, a message being sent to the appropriation application server 34 to notify it of this. The call is transferred from the terminal in this area that can be appropriated (the television) to their mobile telephone (after confirmation by the user), the appropriation service then interrupting the video stream sent to the television and the call continuing on the user's mobile terminal.

Similarly, if the user in possession of their WiFi access point is in SIP video communication with a colleague and enters an area (or room) containing a terminal that can be appropriated (for example if the user still communicating via their mobile terminal moves back toward their television), when the location means (either the terminal or the location server depending on the location variant) detect that the user has just entered the room, the location means send an alert to the appropriation application server 34, for example by sending an "http GET" message in the form:
http://PAGUREaddress/pagure/
LocinfoServlet?sphere=home&macaddr=00:01:02:03:04: 05& action=in
where
- "sphere=home": indicates that the user has the home version of the PAGURE application on their terminal;
- "macaddr=00:01:02:03:04:05" gives the MAC address of the mobile terminal used (because it is possible to have a plurality of mobile terminals communicating with the appropriation application AS);
- "action=in" indicates to the appropriation application server that the user has just entered the room.

The appropriation application server 34 detects the presence of the terminal and proposes enhancing the call by using the television. For example, if the server responds with a message containing:
confirm=YES
this means that the user is communicating via their mobile terminal and that it is therefore necessary to display a message (for example a popup) on the mobile terminal to prompt the user to accept transfer of their call to the terminal in the room that can be appropriated. The user's response is then sent to the appropriation application server 34 by means of an "http GET" message of the form:
http://PAGUREaddress/pagure/
LocinfoServlet?confirmed=YES&macaddr=00:01:02:03: 04:0 5
where
- "confirmed=YES" indicates to the server whether the user wishes to transfer the call (YES) or not (NO);
- "macaddr=00:01:02:03:04:05" gives the MAC address of the mobile terminal used.

The appropriation application server 34 then (after confirmation by the user) transfers the call in progress from the user's mobile terminal to the terminal in the area that can be appropriated. The user can thus continue their video conversation using a more suitable terminal (large screen, stereo sound, 3D video, etc.), i.e. employing call processing capabilities better than those of their mobile terminal.

In a variation of the invention, as long as the user remains in the visited area, the location means continue to send these messages (for example "in request") at regular intervals (for example every minute) to the appropriation application server 34 until the user leaves the room. The appropriation application server 34 must obviously not respond with a message "confirm=YES" to each message received. Thus when the appropriation application server 34 no longer receives these entry messages, that means that there is a network break or that the user is probably outside the WiFi coverage area. It can then consider the user to have left the room.

If the person with whom the user is communicating has a terminal that has 3D capabilities (two media streams generated for a 3D view) and the terminal in the room also has this feature, then the two persons can communicate in 3D.

A user in an area in which they have appropriated a terminal can use that terminal to contact another party in a transparent manner. For the other party, the call request is sent by the user, i.e. the ID of the calling device presented to the correspondent is that of the user's terminal and not that of the terminal in this area that can be appropriated and is used to send the call request.

In the same manner as previously, the user can obtain the benefit of the 3D capabilities of the terminal in the room that can be appropriated to contact another party (if said party has a device with the same capabilities, of course).

In a variant of the invention, the appropriation application is presented in the form of an icon on the screen of the user's terminal to enable use of IP telephony software. It reappears to display a call transfer confirmation request. It can indicate to the user its presence in the room and has a configuration portion. In a variant of the invention, in which at least two devices are available in the room, the confirmation request prompts the user to choose to which of the two devices the call should be transferred.

In a variant of the invention, the appropriation application is configured by entering for a user terminal one or more WiFi access points that it will use to determine the presence of the user terminal. In one embodiment, the WiFi access point is chosen from a pull-down list giving the access point names and MAC addresses (so that two access points with the same name can be distinguished). This choice is independent of the access point for connecting the terminal to the network.

In a variant of the invention, the appropriation application is configured by determining an entry power threshold. In one particular embodiment, as this threshold is highly dependent on the environment, the appropriation application enables the user to adjust it. For example different buttons are displayed to enable three different thresholds (near, medium, distant) to be chosen, for example spaced by −5 dBm. For even greater precision, a numerical field can be provided for the user to enter the value they require.

In the same way, the appropriation application is configured by determining an exit threshold power. Two methods can be made available:
- either adding a fixed value of a few dB to the entry power (for example −8 dBm); then even if the entry power is modified, the exit power remains consistent with the entry power;
- or adding a numerical field into the panel for configuring the application.

In the situation of location by the terminal, these powers configure the appropriation client application of the user terminal.

Furthermore, the location means (whether of the user terminal or the location terminal) must be adapted to communicate with the appropriation application server 34 (for example must know its address).

Figure 7:
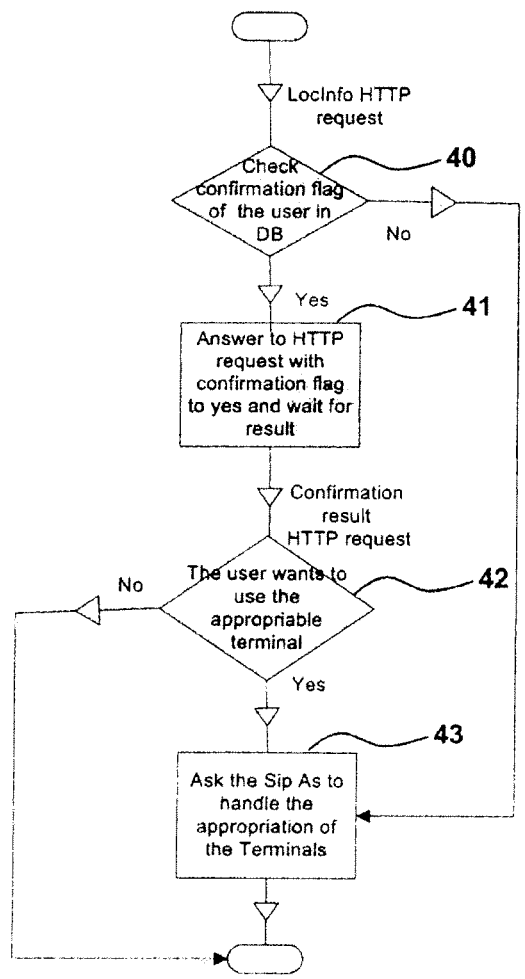
FIG. 7 is a flowchart illustrating certain aspects of the appropriation method of the invention.

FIG. 7 illustrates certain aspects of the appropriation method of the invention, which includes verification of the location of the user terminal if the user has changed status (entered or left the area). If the user has changed status, one embodiment of the invention provides a request 41 to the user to confirm the transfer before it is effected. If the user confirms transfer (42), the interface server (http Servlet) requests (43) the appropriation application server 34 to proceed with attaching (respectively detaching) the device to/from the user terminal and with the transfer. If the location is not confirmed, the terminal is considered to have left the area and the interface server (http Servlet) requests the appropriation application server 34 to deal with detaching the device from the user terminal.

The exchanges shown in FIGS. 8*a*, 8*b*, 9 to 14 take place between the following entities:
- a mobile terminal 33 (SIP Mobile Terminal);
- a WiFi access point 32 (Mobile Access Point);
- a terminal 31 that can be appropriated (Appropriable Terminal);
- an application server 34 (Pagure AS);
- a SIP terminal 37 (SIP User B); and
- a content server 17 (Video Clip Server).

Figure 8A:
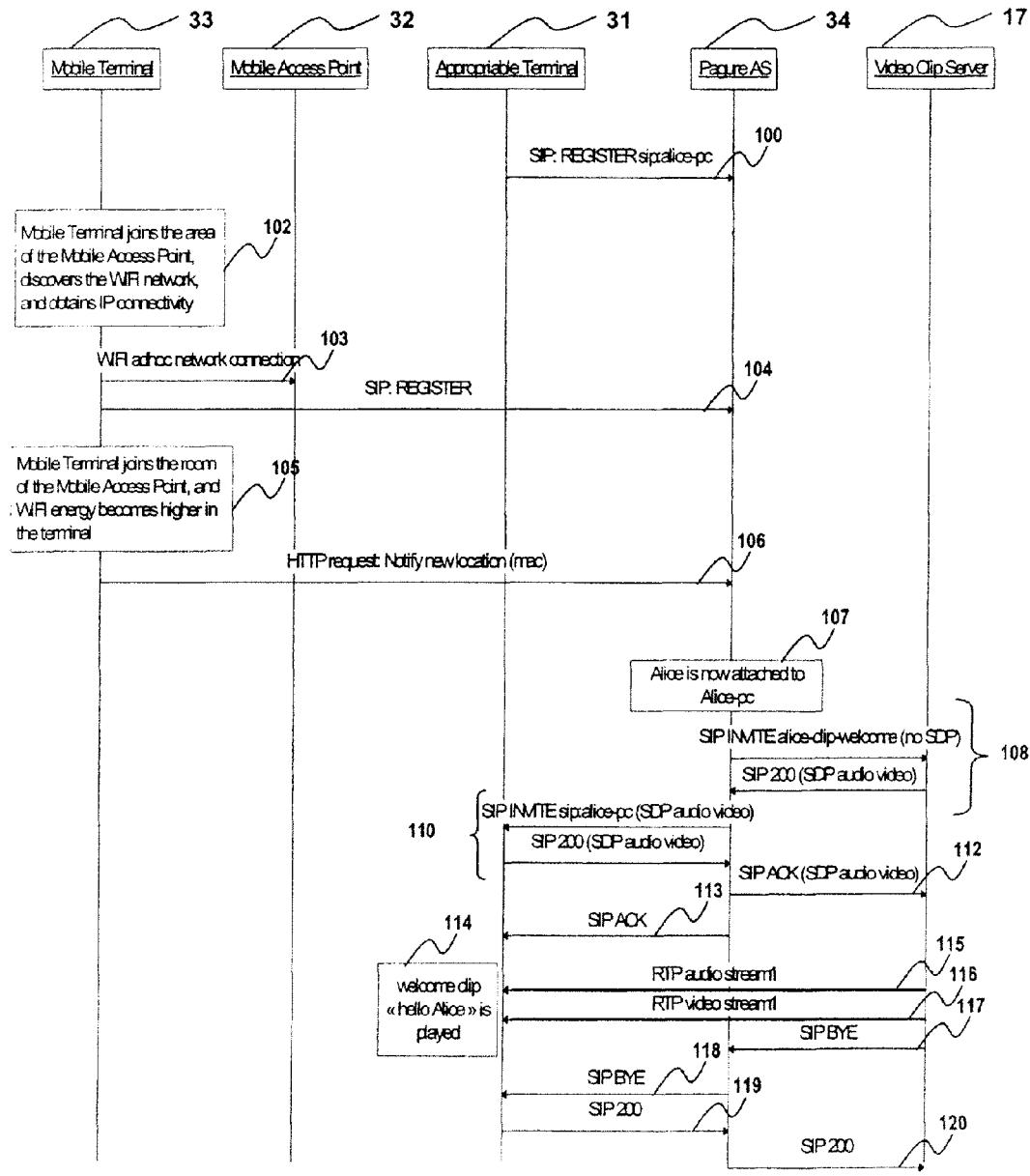
FIGS. 8a and 8b are sequence diagrams illustrating an exchange of messages between various entities.
Figure 8B:
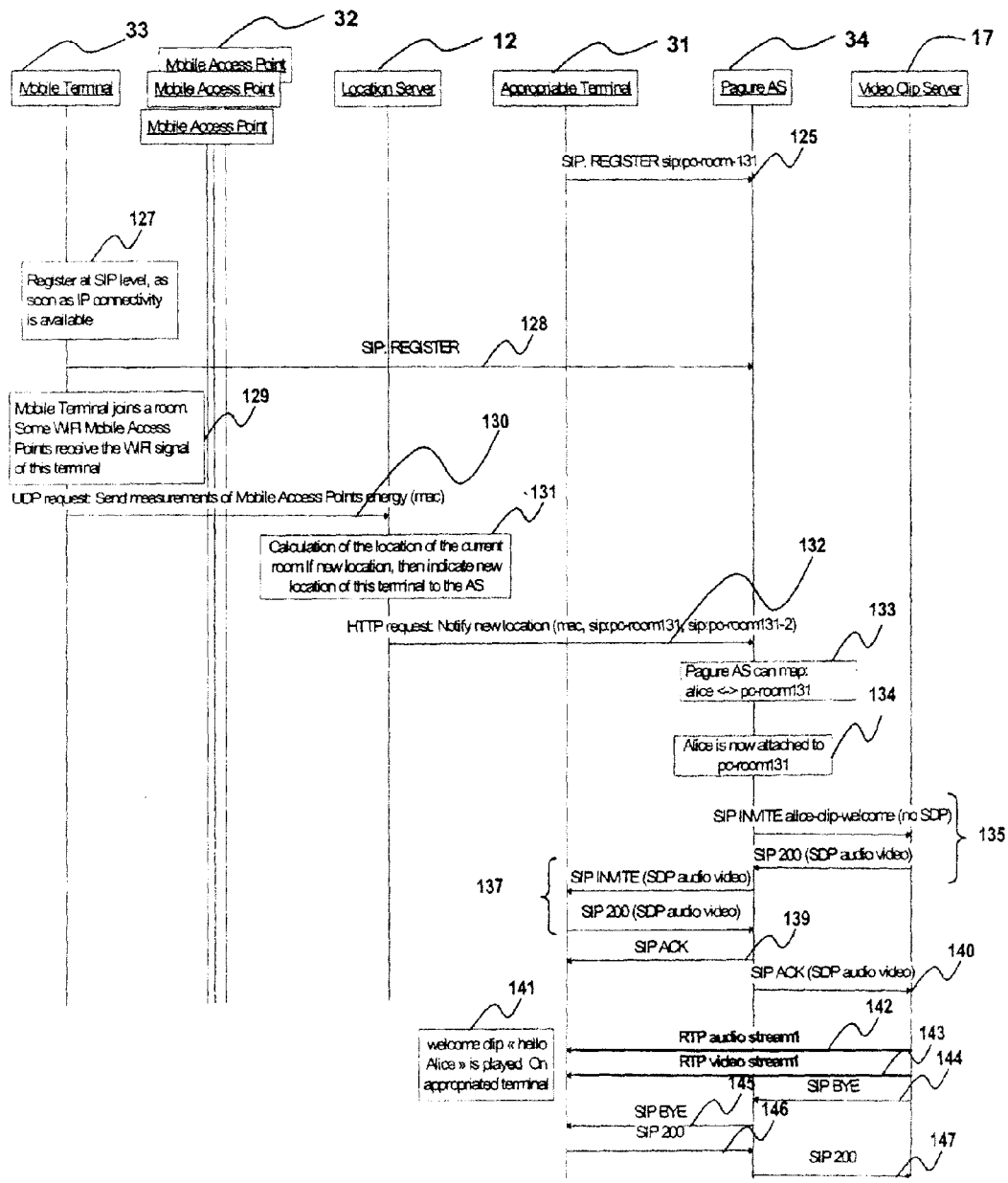

FIGS. 8a and 8b show exchanges during the appropriation stage between the user terminal (Mobile Terminal), the WiFi access point (Mobile Access Point), the device of the area covered by said access point (Appropriable Terminal), the appropriation application server 34 (Pagure AS), and, optionally, the clip server (Video Clip Server), respectively for location by the user terminal (FIG. 8a) and for location by a location server (FIG. 8b), optionally followed, as already indicated, by a welcome stage.

The various exchange stages shown in FIG. 8a when location is effected by the user terminal are as follows:

a stage of registering the appropriable terminal 31 with the application server 34, including sending 100 a SIP REGISTER message;

a stage of connecting the mobile terminal 33 to the WiFi access point including, after entering 102 the coverage area of an access point, sending 103 a connection message (WIFI ad hoc network connection);

a stage of registering the mobile terminal 33 with the application server 34, including sending 104 a SIP REGISTER message;

a stage of modifying 105 the location of the mobile terminal 33, in which the mobile terminal 33 sends 106 the application server 34 a message ("HTTP request: Notify new Location") to notify its location; the application server 34 then registers 107 the mobile terminal 33 as being attached to the appropriable terminal 31;

a stage of setting up a call between the appropriable terminal 31 and the content server 17, including a preliminary stage of negotiating parameters including sending SIP INVITE and SIP 200 messages (and SIP ACK acknowledgements) exchanged firstly 110, 113 between the application server 34 and the appropriable terminal 31 and secondly 108, 112 between the application server 34 and the content server 17, this stage of setting up communication leading to the setting up 115, 116 of an audio stream ("RTP audio stream") and a video stream ("RTP video stream") between the appropriable terminal 31 and the content server 17, these two streams being output streams of the content server 17 using the parameters that were determined during negotiation; in this way a welcome video clip can be displayed on the appropriable terminal 31; and an end call stage (117 to 120) during which the SIP link between the application server 34 and the content server 17 (SIP BYE messages) is interrupted, followed by that between the application server 34 and the appropriable terminal 31 (SIP BYE messages).

The various exchange stages shown in FIG. 8b when location is effected by the location server are as follows:

a stage of registering the appropriable terminal 31 with the application server 34, including sending 125 a SIP REGISTER message;

a stage of registering 127 the mobile terminal 33 with the application server 34, including sending 128 a SIP REGISTER message; this stage is executed as soon as the mobile terminal 33 acquires IP connectivity;

a stage of locating the mobile terminal 33 during which, following modification 129 of the location of the mobile terminal 33, the mobile terminal 33 sends 130 the location server a UDP request (UDP request: Send measurements of Mobile Access Points energy) comprising the measured values of the transmission powers received by the mobile terminal 33 for the various access points; the location server determines 131 the location of the mobile terminal 33 from these measured values and then sends 132 the application server 34 a request to inform the application server 34 of the current location of the mobile terminal 33 (HTTP request: Notify new location); on receiving this request, the application server 34 determines 133 that the mobile terminal 33 is in a given area; the application server 34 then registers 134 the mobile terminal 33 as being attached to the appropriable terminal 31;

a communication set-up stage (141-143) identical to that of FIG. 8a; and an end call stage (144-147) identical to that of FIG. 8b.

Figure 9:
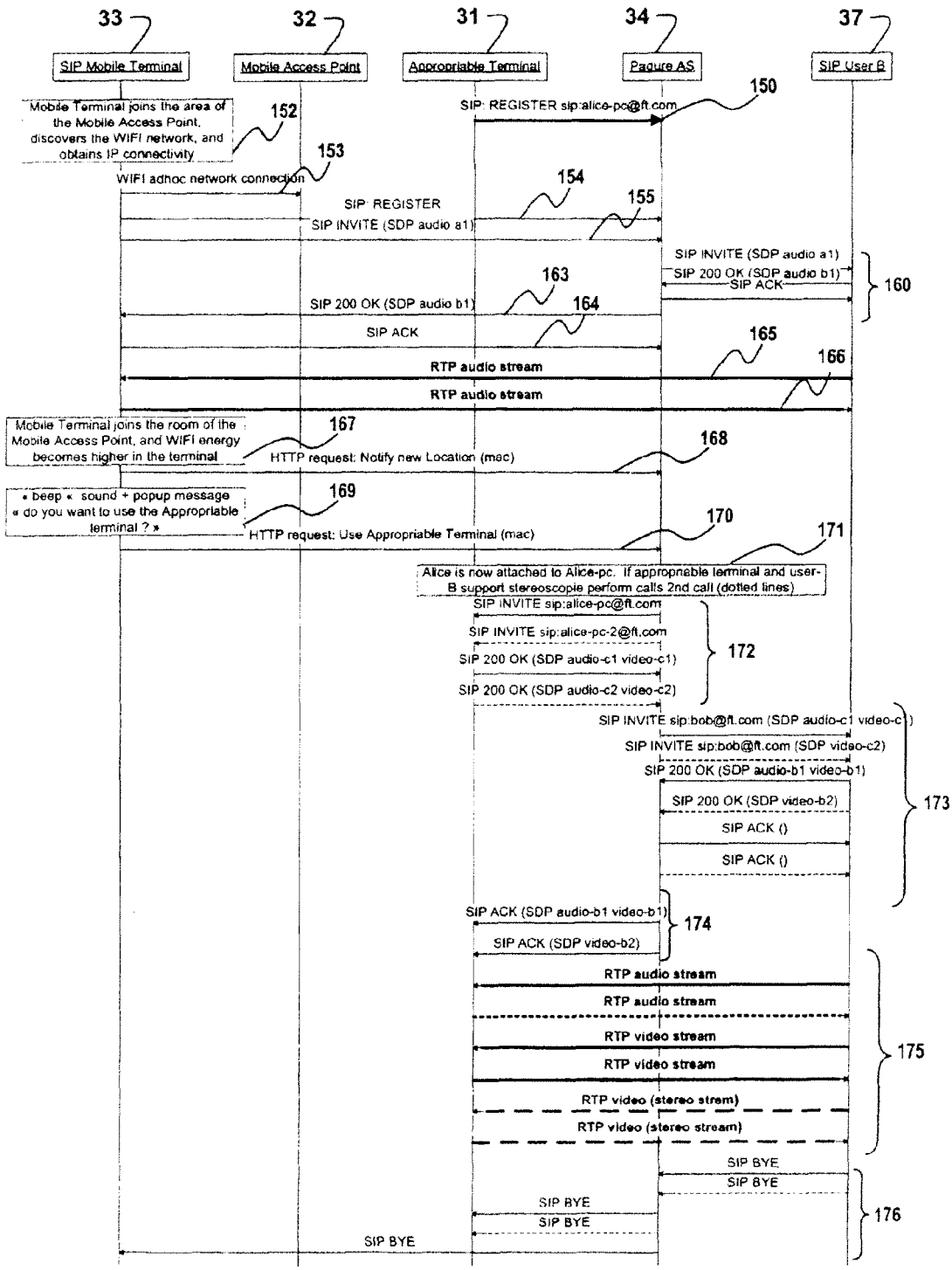
FIGS. 9-14 are further sequence diagrams illustrating an exchange of messages between various entities.
Figure 10:
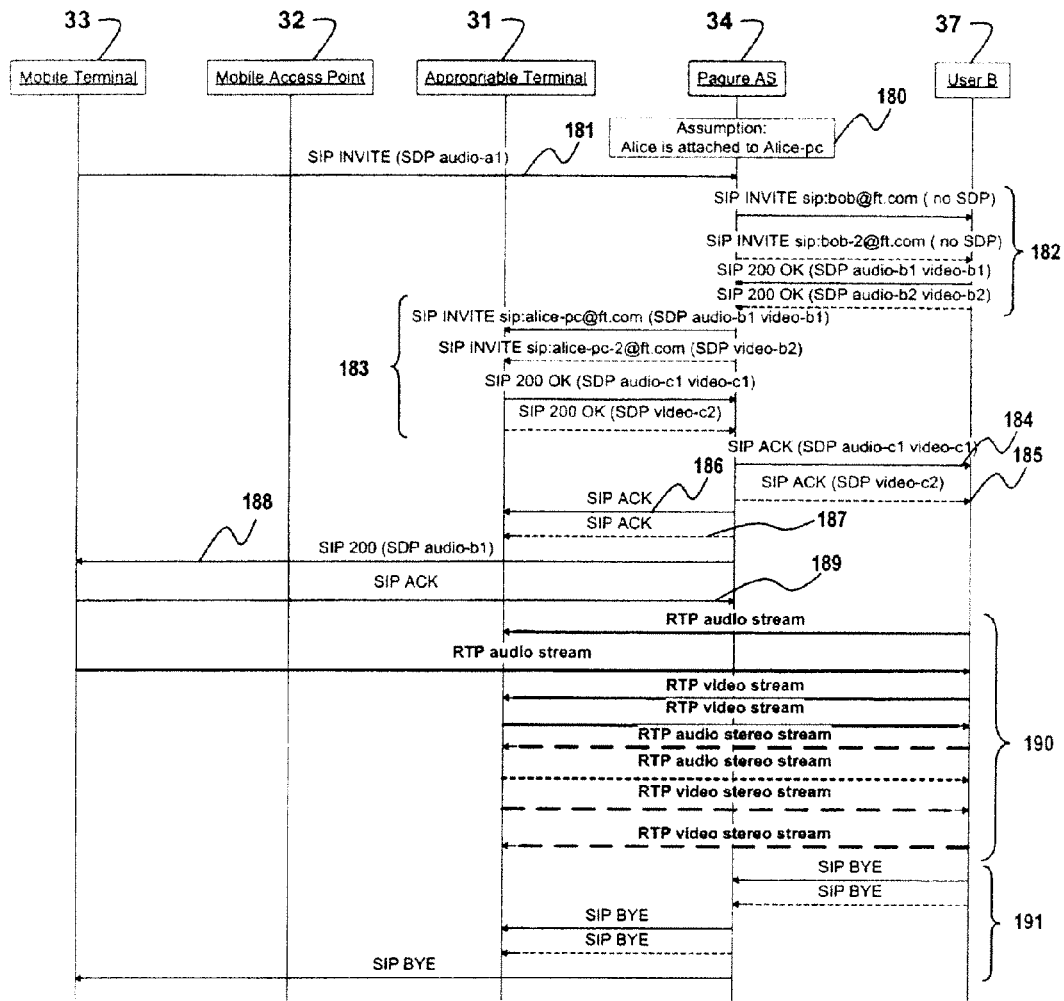
Figure 11:
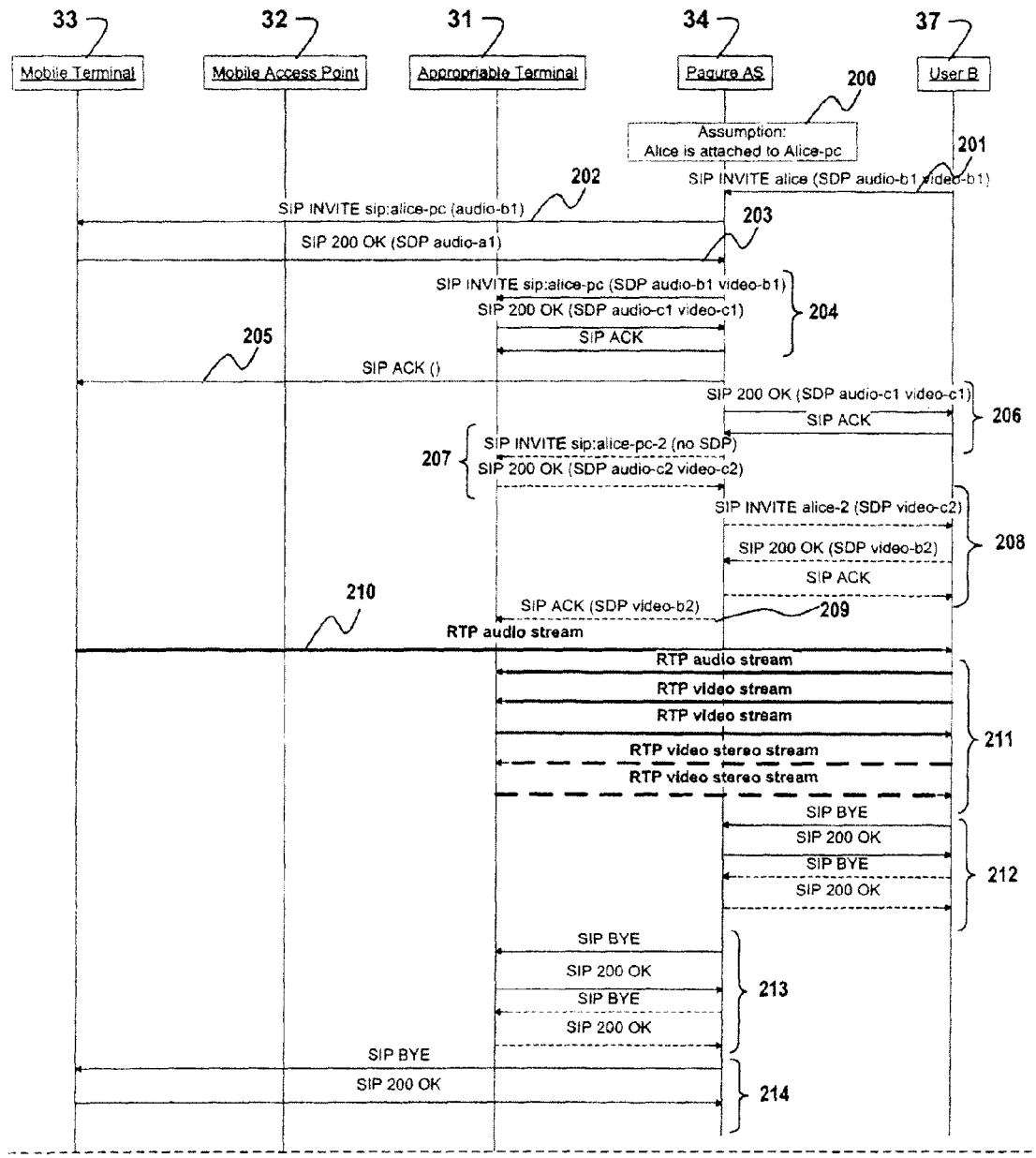
Figure 12:
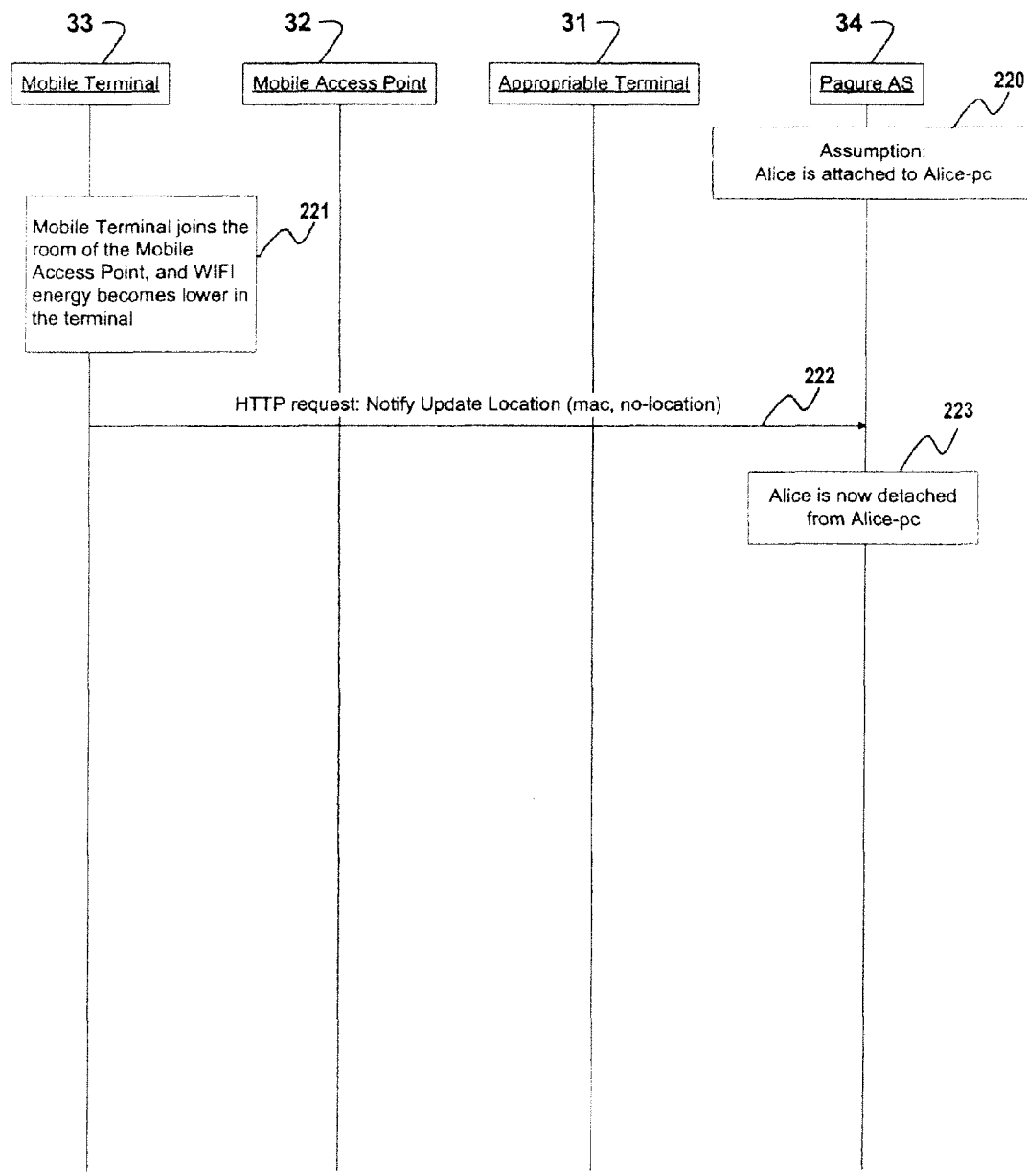
Figure 13:
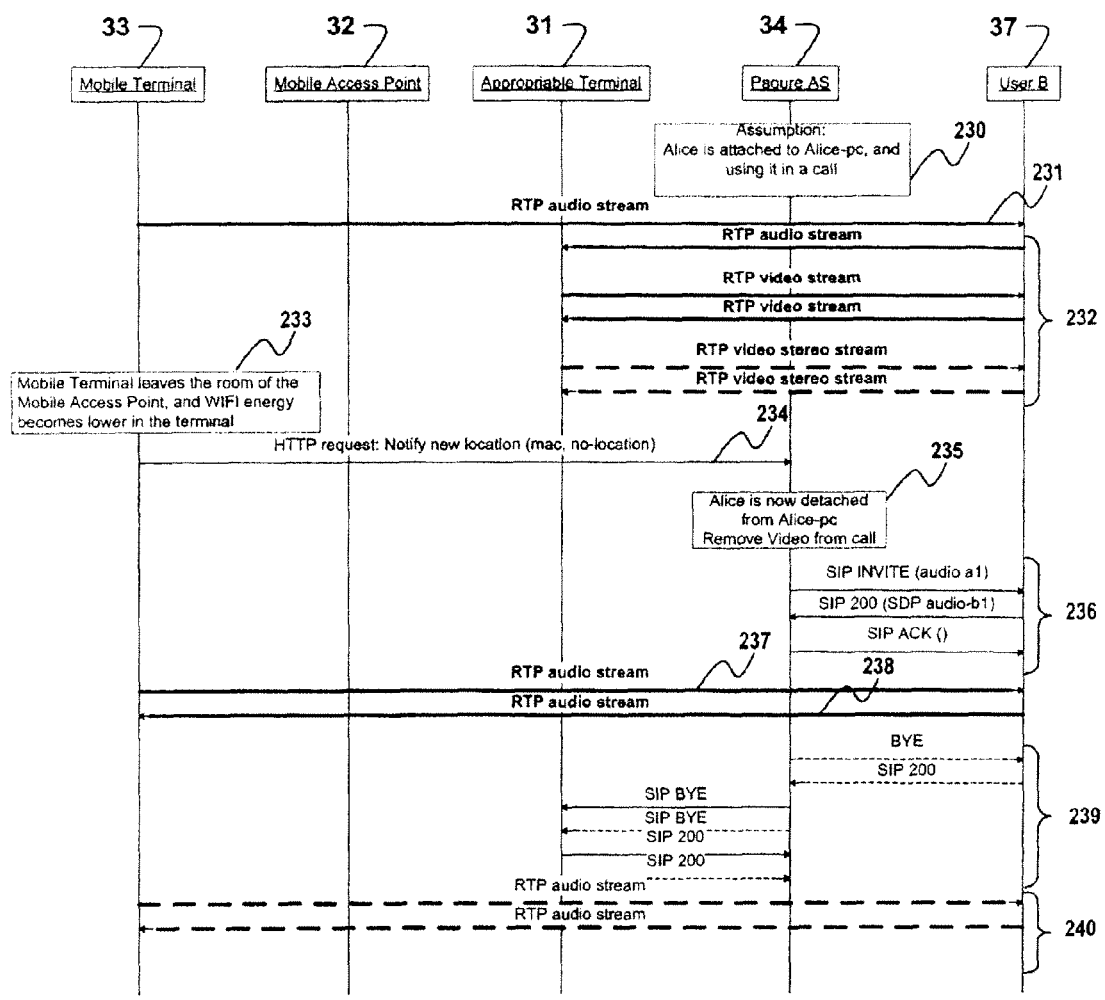
Figure 14:
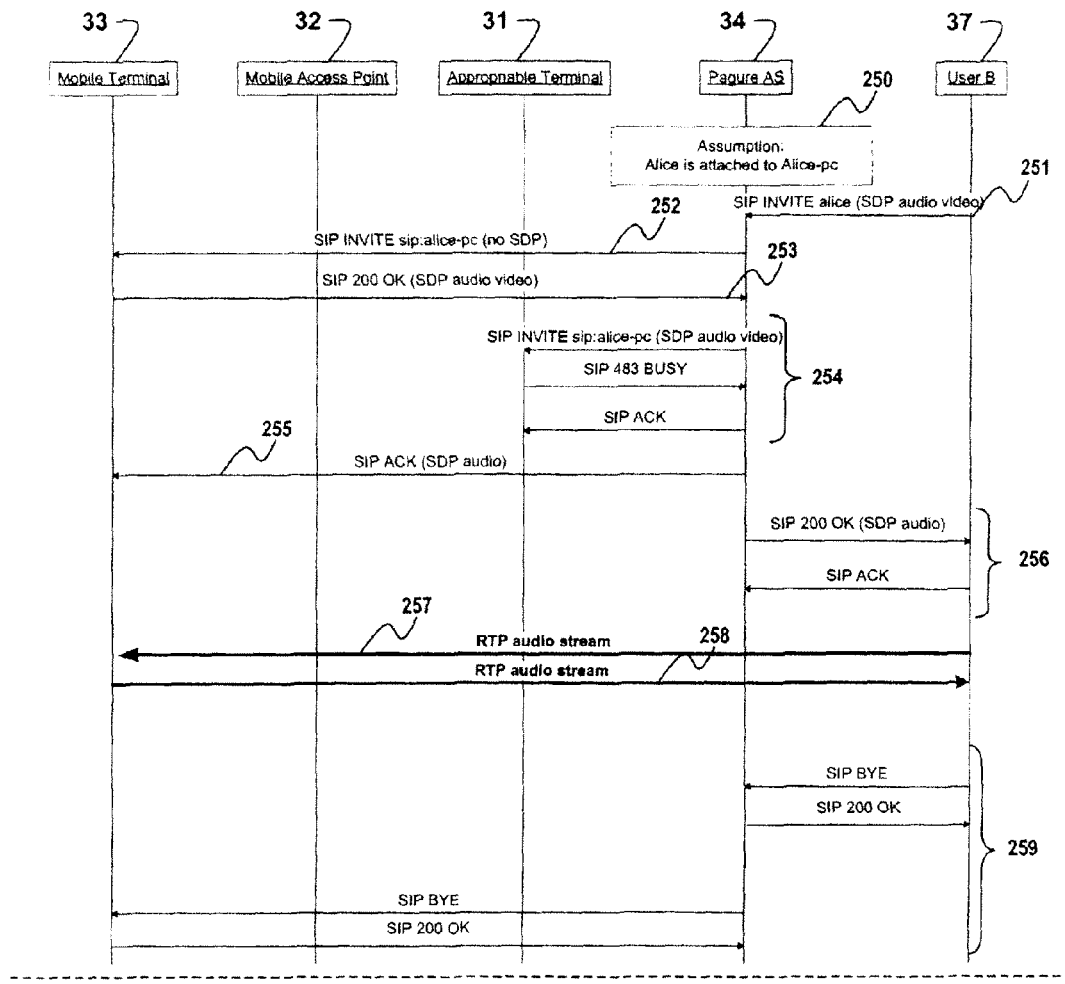

FIGS. 9 to 14 show the exchanges between these devices when location is by the user terminal, respectively:

on entering an area with a device 31 with a call in progress (FIG. 9);

during call set-up using a device 31 of a visited area (FIG. 10);

during reception of a call using a device 31 of a visited area (FIG. 11);

on leaving a visited area (FIG. 12);

on leaving a visited area with a call in progress (FIG. 13); and on receiving a call request when the device 31 is not available (FIG. 14).

FIGS. 10 to 14 show the exchanges that take place after the attachment stage. The attachment stage is either that described with reference to FIG. 8a or that described with reference to FIG. 8b. The exchanges that take place after the attachment stage are identical whichever version of the attachment stage is used to attach the device to the terminal.

The various exchange stages shown in FIG. 9 are as follows:

a stage of registering the appropriable terminal 31 with the application server 34, including sending 150 a SIP REGISTER message;

a stage of connecting the mobile terminal 33 to the WiFi access point 32, including, after entering 152 the coverage area of an access point 32, sending 153 a connection message (WiFi ad hoc network connection);

a stage of registering the mobile terminal 33 with the application server 34, including sending 154 a SIP REGISTER message;

a stage of setting up communication between the mobile terminal 33 and the terminal 37, including a step of sending 155 a call set-up request (SIP INVITE) then a stage of negotiating parameters including sending SIP INVITE and SIP OK messages (and SIP ACK acknowledgements), exchanged firstly 163-164 between the application server 34 and the mobile terminal 33 and secondly 160 between the application server 34 and the terminal 37, this negotiation stage leading to setting up 165-166 two audio streams (RTP audio stream) between the mobile terminal 33 and the terminal 37, the first stream being an output stream from the terminal 37 and an input stream to the mobile terminal 33, the second stream being an output stream of the mobile terminal 33 and an input stream of the terminal 37, these streams using the parameters that were determined during negotiation;

a stage of modifying 167 the location of the mobile terminal 33, after which the mobile terminal 33 sends 168 the application server 34 a message ("HTTP request Notify new Location") to notify its location;

a stage of requesting appropriation of the appropriable terminal 31, in which, after confirmation 169 by the user, the mobile terminal 33 sends 170 a message ("HTTP request Use Appropriable Terminal") to request use of the appropriable terminal 31; the application server 34 then registers 171 the mobile terminal 33 as being attached to the appropriable terminal 31;

a stage of transferring the call set up between the mobile terminal 33 and the terminal 37, including a preliminary negotiation stage including sending SIP INVITE messages (and SIP ACK acknowledgements) during which two signaling links are set up: firstly 172, 174 between the application server 34 and the appropriable terminal 31 and secondly 173 between the application server 34 and the terminal 37; this negotiation stage leads to setting up 175 two audio streams (RTP audio stream) between the appropriable terminal 31 and the terminal 37, the first stream being an output stream of the terminal 37 and an input stream of the appropriable terminal 31, the second stream being an output stream of the appropriable terminal 31 and an input stream of the terminal 37; this negotiation stage leads to setting up two video streams (RTP video stream) between the appropriable terminal 31 and the terminal 37, the first stream being an output stream of the terminal 37 and an input stream of the appropriable terminal 31, the second stream being an output stream of the appropriable terminal 31 and input stream of the terminal 37. If the terminals 31 and 37 have 3D capabilities, this negotiation stage furthermore leads to setting up two video steams (RTP video stream) between the appropriable terminal 31 and the terminal 37, the first stream being an output stream of the terminal 37 and an input stream of the appropriable terminal 31, the second stream being an output stream of the appropriable terminal 31 and an input stream of the terminal 37; the audio and video streams set up in this way use the parameters determined during negotiations; and a communication termination stage 176 during which the SIP link between the application server 34 and the terminal 37 is interrupted (SIP BYE messages), followed by that between the application server 34 and the appropriable terminal 31 (SIP BYE messages), and finally between the application server 34 and the mobile terminal 33 (SIP BYE messages); in other words, the SIP signaling link between the application server 34 and the mobile terminal 33 is maintained throughout the call set up between the three terminals 31, 33, and 37, including after transfer of certain payload streams from the mobile terminal 33 to the appropriable terminal 31.

In this example, all the payload data streams forming part of the call are set up between the terminal 31 and the terminal 37.

The various exchange stages shown in FIG. 10 take place after the application server 34 has registered 180 the mobile terminal 33 as being attached to the appropriable terminal 31; those stages are as follows:

an initial step of the mobile terminal 33 sending 181 the application server 34 a request to set up a call with the terminal 37, this request being sent in the form of a SIP INVITE message;

a stage of setting up a call between the three terminals 31, 33, and 37, including a preliminary stage of negotiating parameters including sending of SIP INVITE and SIP OK messages (and SIP ACK acknowledgements), three signaling links being set up: the first 188, 189 between the application server 34 and the mobile terminal 33, the second 183, 186, 187 between the application server 34 and the appropriable terminal 31, and the third 182, 184, 185 between the application server 34 and the terminal 37; this call set-up stage leads to setting up 190 four audio streams (RTP audio stream) and four video streams (RTP video stream):

a first audio stream from the output of the terminal 37 to the input of the appropriable terminal 31;

a second audio stream from the output of the mobile terminal 33 to the input of the terminal 37;

a first video stream from the output of the terminal 37 to the input of the appropriable terminal 31;

a second video stream from the output of the appropriable terminal 31 to the input of the terminal 37;

a third audio stream (stereo stream associated with the first audio stream) from the output of the terminal 37 to the input of the appropriable terminal 31;

a fourth audio stream (audio stream associated with the second audio stream) from the output of the appropriable terminal 31 to the input of the terminal 37;

a third video stream (stereo stream associated with the first video stream) from the output of the appropriable terminal 31 to the input of the terminal 37;

a fourth video stream (stereo stream associated with the second video stream) from the output of the terminal 37 to the input of the appropriable terminal 31;

the audio and video streams set up in this way use the parameters that were determined during negotiation; in this example, the user of the mobile terminal 33 continues to use the mobile terminal to converse with the other party using the terminal 37 but listens to the other party via the appropriable terminal 31; the user views video coming from the terminal 37 on the appropriable terminal 31 and sends video to the user of the terminal 37 via the appropriable terminal 31; and an end call stage 191 during which the SIP signaling link between the application server 34 and the terminal 37 is interrupted (SIP BYE messages), followed by that between the application server 34 and the appropriable terminal 31 (SIP BYE messages), and finally that between the applicable server 34 and the mobile terminal 33 (SIP BYE messages); in other words, the SIP signaling link between the application server 34 and the mobile terminal 33 is maintained throughout the call set up between the three terminals 31, 33, and 37.

Maintaining a signaling link between the mobile terminal 33 and the application server 34 throughout the call means commands can be sent over this link to the application server 34 and commands received from the application server 34 at any time during the call. The user of the mobile terminal 33 therefore retains control of the call via the mobile terminal 33. The mobile terminal 33 serves as a control interface for controlling the call.

This is useful for transferring the call back to the mobile terminal 33 at the request of the mobile terminal user. The payload streams set up with the appropriable terminal 31 attached to the mobile terminal 33 are then transferred to the mobile terminal 33 if the capabilities of the mobile terminal allow this, or else they are interrupted.

Maintaining a signaling link between the mobile terminal 33 and the application server 34 is also useful for sending information to the user A during the call, for example to notify them of another call set-up request, or any other information.

The situation in FIG. 11 is similar to that in FIG. 10, with the difference that the call set-up request emanates from the terminal 37 and not from the mobile terminal 33. The negotiation stage is conducted as in FIG. 10 by the application server 34, which sets up a signaling link with each of the terminals 33, 31, and 37. In the example shown by FIG. 11 this negotiation stage leads to setting up 211 two audio streams (the first two streams described with reference to FIG. 10) and four video streams (the four video streams described with reference to FIG. 10), namely:

a first audio stream from the output of the mobile terminal 33 to the input of the terminal 37;

a second audio stream from the output of the terminal 37 to the input of the appropriable terminal 31;

a first video stream from the output of the terminal 37 to the input of the appropriable terminal 31;

a second video stream from the output of the appropriable terminal 31 to the input of the terminal 37;

a third video stream (stereo (3D) stream associated with the first video stream) from the output of the terminal 37 to the input of the appropriable terminal 31; and a fourth video stream (stereo (3D) stream associated with the second video stream) from the output of the appropriable terminal 31 to the input of the terminal 37.

FIG. 13 shows the situation of leaving a visited area with a call in progress. The exchange stages shown in FIG. 13 take place after the application server 34 has registered 230 the mobile terminal 33 as being attached to the appropriable terminal 31 and are as follows:

a first stage of communication between the three terminals 31, 33, and 37 in which the payload data streams set up 231, 232 are as follows:

a first audio stream from the output of the mobile terminal 33 to the input of the terminal 37;

a second audio stream from the output of the terminal 37 to the input of the appropriable terminal 31;

a first video stream from the output of the appropriable terminal 31 to the input of the terminal 37;

a second video stream from the output of the terminal 37 to the input of the appropriable terminal 31;

a third video stream (stereo (3D) stream associated with the first video stream) from the output of the appropriable terminal 31 to the input of the terminal 37;

a fourth video stream (stereo (3D) stream associated with the second video stream) from the output of the terminal 37 to the input of the appropriable terminal 31;

in this example, the user of the mobile terminal 33 uses the mobile terminal 33 to converse with the other party using the terminal 37, but listens to the other party via the appropriable terminal 31; the user views video coming from the terminal 37 on the appropriable terminal 31 and sends video to the user of the terminal 37 via the appropriable terminal 31;

a stage of modifying 233 the location of the mobile terminal 33, in which the mobile terminal 33 sends 234 a message ("HTTP request: Notify new Location") to notify its location to the application server 34; the mobile terminal 33 being outside the area of the appropriable terminal 31, the application server 34 registers 235 the mobile terminal 33 as being detached from the appropriable terminal 31;

a stage of transferring the second audio stream by setting up a new audio stream from the output of the terminal 37 to the input of the mobile terminal 33, including a preliminary negotiation stage during which the application server 34 sends 236 the terminal 37 a SIP INVITE message via the signaling link; this negotiation stage leads to setting up 237, 238 the new audio stream (RTP audio stream) between the terminal 37 and the mobile terminal 33, the first audio stream 231, 237 being unaffected by this transfer; the new audio stream set up in this way uses the parameters that were determined during negotiation; and an end call stage 239 during which the SIP signaling link between the application server 34 and the appropriable terminal 31 (SIP BYE messages) is interrupted, as well as all the payload data streams entering or leaving the appropriable terminal 31.

Following these stages, the user of the mobile terminal 33 dialogues 240 with the user of the terminal 37 without exchanging video streams.

Once again, the signaling link between the mobile terminal 33 and the application server 34 is maintained throughout the call.

FIG. 12 corresponds to the stage of modifying the location of the mobile terminal 33 described with reference to FIG. 13 after which, the mobile terminal 33 leaving 221 the area of the appropriable terminal 31, the application server 34 registers 223 the mobile terminal 33 as being detached from the appropriable terminal 31, after receiving 222 an HTTP request (http request: Notify Update Location) notifying the new location of the mobile terminal 33.

FIG. 14 corresponds to receiving a call request when the appropriable terminal 31 is not available. These exchanges take place after the application server 34 has registered 250 the mobile terminal 33 as being attached to the appropriable terminal 31. These stages are identical to the situation described with reference to FIG. 11 (reception of a call request by the mobile terminal 33), with the following differences:

on receiving the call set-up request 251 from the terminal 37, the application server sends 252 the request to the mobile terminal 33 and then attempts to set up 254 a call with the appropriable terminal 31 and receives an SIP BUSY message indicating that the terminal is busy; a call is finally set up 257, 258 between the mobile terminal 33 and the terminal 37, the payload streams set up being as follows:

a first audio stream from the output of the terminal 37 to the input of the mobile terminal 33;

a second audio stream from the output of the mobile terminal 33 to the input of the terminal 37;

the audio streams set up in this way use the parameters that were determined during the preliminary negotiation stage (252, 253, 255, 256); and an end call stage 259 during which the SIP signaling link between the application server 34 and the terminal 37 (SIP by messages) is interrupted, followed by the SIP signaling link between the application server 34 and the mobile terminal 33.

Figure 15:
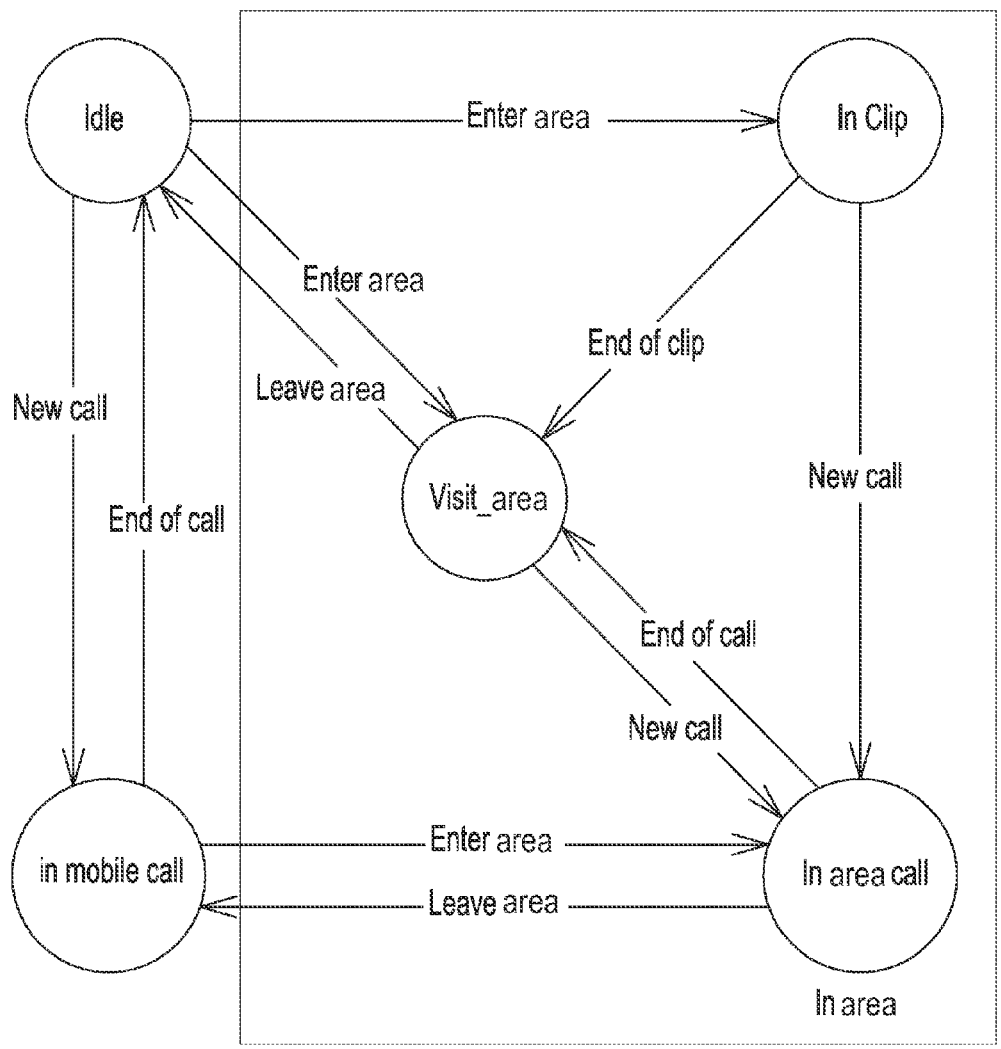
FIG. 15 is a state diagram illustrating the state machine of the user terminal.
Figure 16:
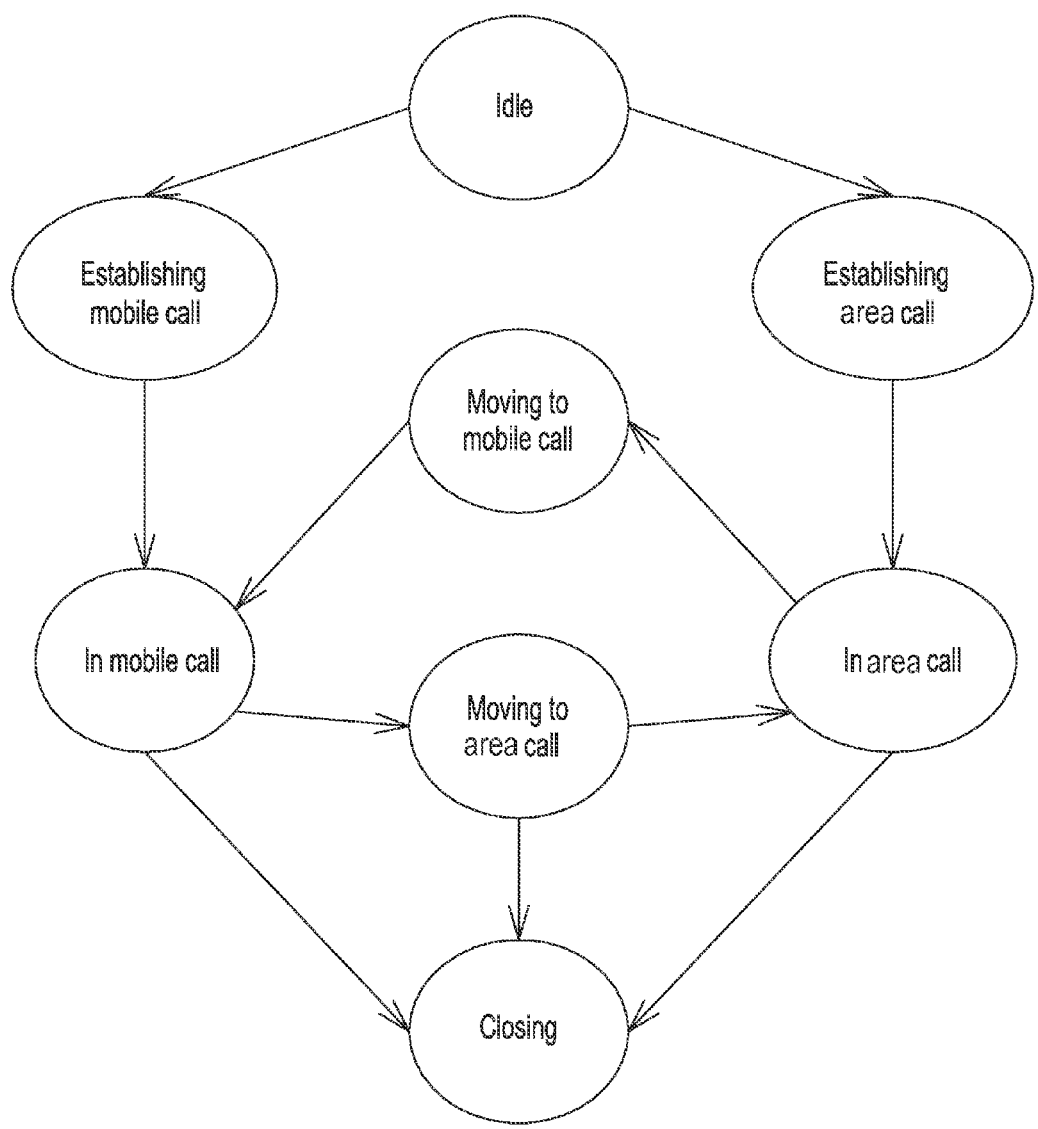
FIG. 16 is a state diagram illustrating a "half call" state machine.
Figure 17:
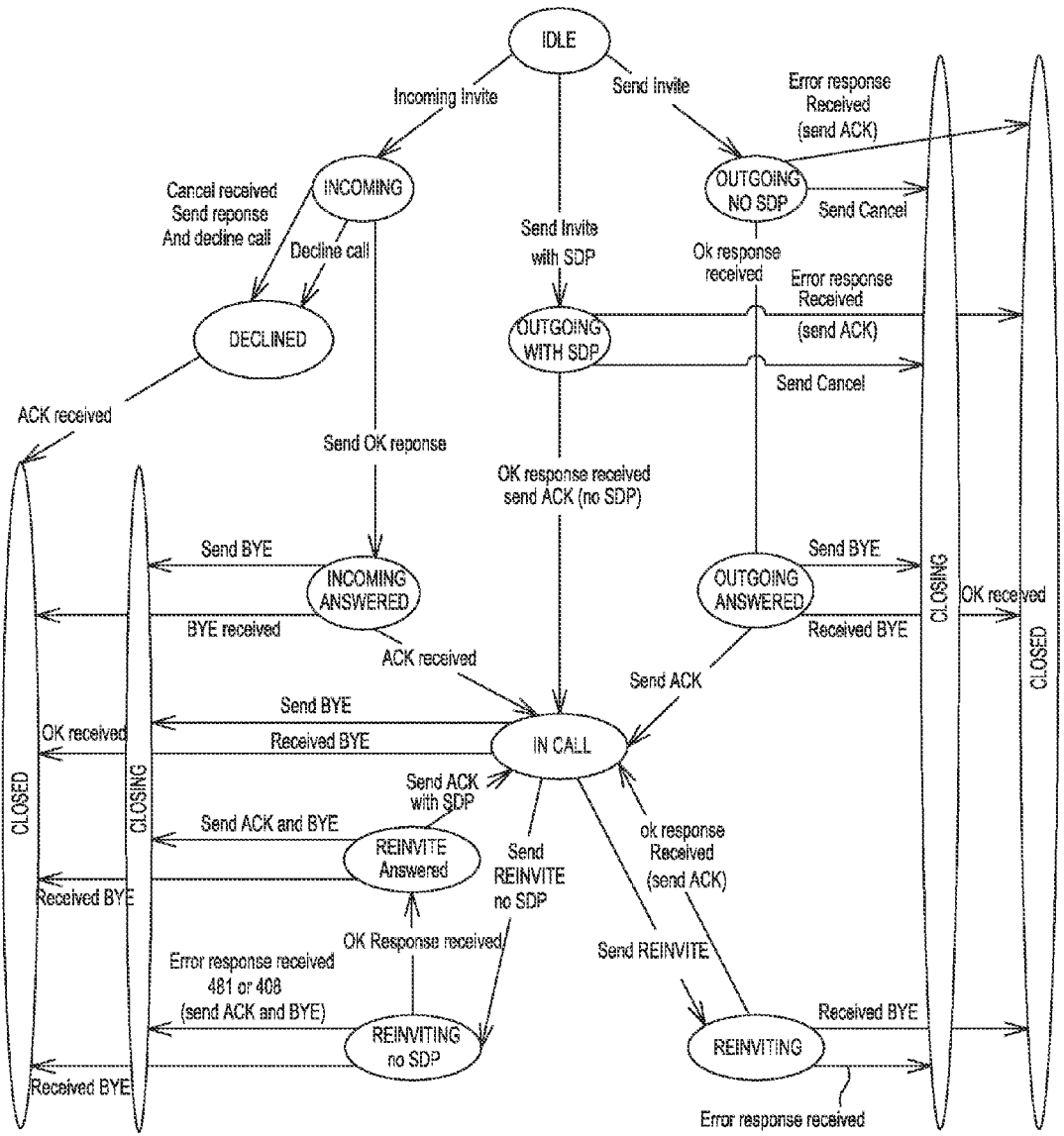
FIG. 17 is a state diagram illustrating a "call leg" state machine.

The appropriation logic can be divided into three parts implemented by three state machines shown in FIGS. 15, 16, and 17, respectively corresponding to the state machine of the user terminal, a "half call" state machine and a "call leg" state machine.

The preceding examples show the appropriation of a device by a terminal for communication applications. This mechanism can also be used to execute a communication application other than a call session, for example for presenting data stored in the user terminal or broadcast data received by the user terminal, playing (online or offline) on the device a game from the user terminal, etc.

Moreover, the examples given here illustrate appropriation of a multimedia device by a user terminal to transfer to it the whole of an application for communicating with a remote device: for example a videophone call between a mobile terminal and that remote device is transferred to a computer that includes the following interfaces: screen, loudspeakers, microphone, webcam, etc., and that sets up a communications link with the remote device.

The invention can also be used to transfer only a portion of the communication application, in particular the portion corresponding to the processing and reception of the incoming streams of a call by presenting the incoming video and audio on the television (screen and loudspeakers) and retaining on the user terminal the portion corresponding to processing and sending the outgoing streams of the call (using the microphone and the camera of the user mobile terminal).

Moreover, the invention can be used to transfer part of a communication application to a first device such as a 3D projection screen (incoming video from a 3D video call, for example) and another part of the communication application to another device such as a 3D camera, the audio input and output continuing via the user's mobile terminal.

Generalizing, the invention is aimed at a method of dynamic appropriation of at least one second multimedia device by a first device situated in a predefined geographical area including said at least one second multimedia device, said appropriation method including attaching said second multimedia device to said first device so that executing at least part of at least one application of said first device is transferred to said at least one second multimedia device.

In a preferred implementation of the invention, the various steps of the method of the invention are executed by software (computer programs), the software including software instructions intended to be executed by a data processor of a server and being designed to control execution of the various steps of the method.

Consequently, the invention is also directed to a program that can be executed by a computer or a data processor, this program including instructions for controlling execution of the steps of a method as referred to above.

This program can use any programming language and take the form of source code, object code, or a code intermediate between source code and object code, such as a partially-compiled form, or any other desirable form.

The invention is also directed to an information medium that can be read by a computer or data processor and contains instructions of a program as referred to above.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit incorporating the program, the circuit being adapted to execute the method of the invention or to be used in its execution.

Another embodiment of the invention is implemented by means of software and/or hardware components. In this regard, the term "module" as used in the present document can refer either to a software component or to a hardware component. A software component corresponds to one or more computer programs, one or more subroutines of a program, or more generally any element of a program or software adapted to execute a function or a set of functions. A hardware component corresponds to any element of a hardware system able to execute a function or a set of functions.

The invention claimed is:

1. A method of dynamic appropriation of at least one second multimedia terminal device by a first terminal device situated in a geographical area in which said at least one second multimedia terminal device is situated in the event of a request to set up a call between the first device and a third device, the method comprising:
a step of setting up a first signaling link between a server and the first device; and
a step of controlling the second and third devices from said server with a view to setting up between the second and third devices at least one first payload data stream forming a first part of said call;
wherein the first signaling link is maintained during said call, making shared and simultaneous use of the first and second terminal devices in call with the third device.

2. The method according to claim 1, a step of controlling the first and third devices from said server with a view to setting up between the first and third devices at least one second payload data stream forming a second part of said call.

3. The method according to claim 1, wherein a device identifier is presented to the third device during setting up the first payload data stream, this identifier being that of the first device.

4. The method according to claim 1, wherein said at least one first stream is set up initially between the first device and the third device and then transferred between the second multimedia device and the third device after the first device enters said geographical area.

5. The method according to claim 1, wherein said at least one first stream is initially set up between the second multimedia device and the third device and then transferred between the first device and the third device after the first device leaves said geographical area.

6. A non-transitory computer readable storage medium storing a data processing program comprising software instructions for executing a method according claim 1 when said program is executed by a data processor.

7. A non-transitory computer readable storage medium readable by a data processor storing a program comprising program code instructions for executing the steps of a method according to claim 1.

8. The method according to claim 1, wherein said call comprises at least the first payload data stream and a signaling stream, further comprising maintaining the signaling stream between the first device and the third device while the first payload data stream is between the second and third devices.

9. An application server for dynamic appropriation of at least one second multimedia terminal device by a first terminal device situated in a geographical area in which said at least one second multimedia device is situated in the event of a request to set up a call between the first device and a third device, the server comprising:
means for setting up a first signaling link between a server and the first device; and
means for controlling the second and third devices with a view to setting up between the second and third devices at least one first payload data stream forming a first part of said call;
wherein the first signaling link is maintained during said call making shared and simultaneous use of the first and second terminal devices in call with the third device.

10. The server according to claim 9 comprising means for controlling the first and third devices with a view to setting up between the first and third devices at least one second payload data stream forming a second part of said call.

11. The server according to claim 9, wherein said call comprises at least the first payload data stream and a signaling stream, and wherein the signaling stream is maintained between the first device and the third device while the first payload data stream is between the second and third devices.

12. An application server for dynamic appropriation of at least one second multimedia terminal device by a first terminal device situated in a geographical area in which said at least one second multimedia device is situated in the event of a request to set up a call between the first device and a third device, the server comprising:
- a server for setting up a first signaling link between a server and the first device; and
- logic for controlling the second and third devices operative to set up between the second and third devices at least one first payload data stream forming a first part of said call;
- wherein the first signaling link is maintained during said call, making shared and simultaneous use of the first and second terminal devices in call with the third device.

13. The server according to claim 12, further comprising logic for controlling the first and third devices operative to set up between the first and third devices at least one second payload data stream forming a second part of said call.

14. The server according to claim 12, wherein said call comprises at least the first payload data stream and a signaling stream, and wherein the signaling stream is maintained between the first device and the third device while the first payload data stream is between the second and third devices.

* * * * *